(12) United States Patent
Scordilis-Kelley et al.

(10) Patent No.: US 9,105,938 B2
(45) Date of Patent: Aug. 11, 2015

(54) APPLICATION OF FORCE IN ELECTROCHEMICAL CELLS

(75) Inventors: Chariclea Scordilis-Kelley, Tucson, AZ (US); John D. Affinito, Tucson, AZ (US); Lowell D. Jones, Tucson, AZ (US); Yuriy V. Mikhaylik, Tucson, AZ (US); Igor Kovalev, Vail, AZ (US); William F. Wilkening, Tucson, AZ (US); Christopher T. S. Campbell, Tucson, AZ (US); John A. Martens, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 587 days.

(21) Appl. No.: 12/535,328

(22) Filed: Aug. 4, 2009

(65) Prior Publication Data

US 2010/0035128 A1 Feb. 11, 2010

Related U.S. Application Data

(60) Provisional application No. 61/086,329, filed on Aug. 5, 2008.

(51) Int. Cl.
*H01M 2/02* (2006.01)
*H01M 2/16* (2006.01)
(Continued)

(52) U.S. Cl.
CPC ........ *H01M 10/052* (2013.01); *H01M 10/0468* (2013.01); *H01M 10/0481* (2013.01);
(Continued)

(58) Field of Classification Search
CPC ........... H01M 2/10; H01M 2/02; H01M 4/13; H01M 4/58; H01M 4/581; H01M 10/0468; H01M 10/052; H01M 10/058; H01M 10/0481
USPC ........... 429/231.95, 229, 103, 104, 218.1, 66, 429/50, 231.8, 249, 56, 164
See application file for complete search history.

(56) References Cited

U.S. PATENT DOCUMENTS 1,956,243 A * 4/1934 McEachron et al. ............ 429/82
4,063,005 A * 12/1977 Mamantov et al. ........... 429/103
(Continued)

FOREIGN PATENT DOCUMENTS

CN 1121264 A 4/1996
CN 1430304 A 7/2003
(Continued)

OTHER PUBLICATIONS

International Preliminary Report on Patentability from PCT/US2009/004452, mailed Nov. 15, 2010.
(Continued)

*Primary Examiner* — Kenneth Douyette
(74) *Attorney, Agent, or Firm* — Wolf, Greenfield & Sacks, P.C.

(57) ABSTRACT

The present invention relates to the application of a force to enhance the performance of an electrochemical cell. The force may comprise, in some instances, an anisotropic force with a component normal to an active surface of the anode of the electrochemical cell. In the embodiments described herein, electrochemical cells (e.g., rechargeable batteries) may undergo a charge/discharge cycle involving deposition of metal (e.g., lithium metal) on a surface of the anode upon charging and reaction of the metal on the anode surface, wherein the metal diffuses from the anode surface, upon discharging. The uniformity with which the metal is deposited on the anode may affect cell performance. For example, when lithium metal is redeposited on an anode, it may, in some cases, deposit unevenly forming a rough surface. The roughened surface may increase the amount of lithium metal available for undesired chemical reactions which may result in decreased cycling lifetime and/or poor cell performance. The application of force to the electrochemical cell has been found, in accordance with the invention, to reduce such behavior and to improve the cycling lifetime and/or performance of the cell.

18 Claims, 8 Drawing Sheets

(51) Int. Cl.
- *H01M 4/58* (2010.01)
- *H01M 4/40* (2006.01)
- *H01M 10/42* (2006.01)
- *H01M 10/052* (2010.01)
- *H01M 10/04* (2006.01)
- *H01M 10/058* (2010.01)
- *H01M 4/13* (2010.01)

(52) U.S. Cl.
CPC ............. *H01M10/058* (2013.01); *H01M 4/13* (2013.01); *H01M 4/40* (2013.01); *H01M 4/581* (2013.01); *Y02E 60/122* (2013.01)
USPC ................... 429/50; 429/231.95; 429/231.8; 429/164; 429/249

(56) References Cited

U.S. PATENT DOCUMENTS

| | | | |
|---|---|---|---|
| 4,384,029 | A | 5/1983 | Kordesch et al. |
| 4,683,178 | A | 7/1987 | Stadnick et al. |
| 6,120,930 | A * | 9/2000 | Rouillard et al. ............... 429/66 |
| 6,143,216 | A | 11/2000 | Loch et al. |
| 6,165,645 | A | 12/2000 | Nishimura et al. |
| 6,203,947 | B1 | 3/2001 | Peled et al. |
| 7,244,530 | B2 | 7/2007 | Hambitzer et al. |
| 7,354,675 | B2 | 4/2008 | Molter |
| 8,936,870 | B2 | 1/2015 | Affinito et al. |
| 2003/0113624 | A1 | 6/2003 | Kim et al. |
| 2003/0124416 | A1 | 7/2003 | Kaneta |
| 2005/0042515 | A1 * | 2/2005 | Hwang et al. ............ 429/231.95 |
| 2005/0130041 | A1 * | 6/2005 | Fensore, III ................. 429/229 |
| 2006/0024579 | A1 | 2/2006 | Kolosnitsyn et al. |
| 2006/0234117 | A1 | 10/2006 | Fujikawa et al. |
| 2009/0077794 | A1 | 3/2009 | Hirakawa et al. |
| 2010/0035128 | A1 | 2/2010 | Scordilis-Kelley et al. |
| 2010/0143823 | A1 | 6/2010 | Tanaka et al. |
| 2010/0239914 | A1 | 9/2010 | Mikhaylik et al. |
| 2011/0177398 | A1 | 7/2011 | Affinito et al. |
| 2011/0206992 | A1 | 8/2011 | Campbell et al. |
| 2013/0017441 | A1 | 1/2013 | Affinito et al. |
| 2013/0095380 | A1 | 4/2013 | Affinito et al. |
| 2013/0216915 | A1 | 8/2013 | Affinito et al. |

FOREIGN PATENT DOCUMENTS

| | | |
|---|---|---|
| CN | 1874027 A | 12/2006 |
| EP | 0 700 109 A1 | 3/1996 |
| EP | 1 717 879 A1 | 11/2006 |
| EP | 1768202 A | 3/2007 |
| JP | H06-124700 A | 5/1994 |
| JP | 10-55823 A | 2/1998 |
| JP | H10-214638 A | 8/1998 |
| JP | 11-121045 A | 4/1999 |
| JP | 11-219731 A | 8/1999 |
| JP | 2000-268873 A | 9/2000 |
| JP | 2001093577 | 4/2001 |
| JP | 2001 143757 | 5/2001 |
| JP | 2003-297431 A | 10/2003 |
| JP | 2004-213902 A | 7/2004 |
| JP | 2005-056701 A | 3/2005 |
| JP | 2005-063848 A | 3/2005 |
| JP | 2005-353452 A | 12/2005 |
| JP | 2006-310033 A | 11/2006 |
| JP | 2006-310281 A | 11/2006 |
| JP | 2006-313737 A | 11/2006 |
| JP | 2006-318892 A | 11/2006 |
| JP | 2007-257850 A | 10/2007 |
| JP | 2009076260 A | 4/2009 |
| JP | 2009-104902 A | 5/2009 |
| WO | WO 2007/097172 A1 | 8/2007 |

OTHER PUBLICATIONS

European Search Report from EP 11164912.5, mailed Jul. 29, 2011.
Gireaud, L., et al. "Lithium metal stripping/plating mechanism studies: A metallurgical approach," Electrochemistry Communications, 8 (2006) 1639.
Hirai, T., et al. "Influence of electrolyte on lithium cycling efficiency with pressurized electrode stack," J. Electrochem. Soc., 141 (1994) 611.
International Search Report and Written Opinion from PCT/US2009/004452, mailed Dec. 4, 2009.
Chinese Office Communication mailed Mar. 7, 2013 in connection with CN 200980134869.2 and English translation thereof.
Extended European Search Report mailed Nov. 7, 2013 in connection with EP 13178169.2.
Office Communication mailed Dec. 25, 2013 in connection with CN 200980134869.2 and English translation thereof.
Office Communication mailed Jan. 14, 2014 in connection with JP 2011-522052 and English translation thereof.
Office Communication dated Jul. 25, 2014 for Application No. CN 200980134869.2 and English translation thereof.
Final Office Action mailed Oct. 1, 2014 for U.S. Appl. No. 12/727,862.
Office Action mailed Mar. 31, 2015 for U.S. Appl. No. 12/727,862.
Chen et al., Recent advance in lithium-sulfur batteries. J Power Sources. Dec. 1, 2014;267:770-83.
Office Communication and English translation thereof for Application No. CN200980134869.2 mailed Dec. 26, 2014.
Office Communication for Application No. EP09789057.8 mailed Jul. 28, 2011.

* cited by examiner

APPLICATION OF FORCE IN ELECTROCHEMICAL CELLS

RELATED APPLICATIONS

This application claims the benefit of U.S. Provisional Patent Application Ser. No. 61/086,329, filed Aug. 5, 2008, entitled "Application of Force in Electrochemical Cells," by Scordilis-Kelley, et al., the entirety of which is incorporated herein by reference.

FIELD OF INVENTION

The present invention relates to electrochemical cells, and more specifically, to systems and methods for improving the performance of electrochemical cells via the application of a force.

BACKGROUND

A typical electrochemical cell has a cathode and an anode which participate in an electrochemical reaction. Some electrochemical cells (e.g., rechargeable batteries) may undergo a charge/discharge cycle involving stripping and deposition of metal (e.g., lithium metal) on the surface of the anode accompanied by parasitic reactions of the metal on the anode surface with other cell components (e.g., electrolyte components), wherein the metal can diffuse from the anode surface during discharge. The efficiency and uniformity of such processes can affect efficient functioning of the electrochemical cell. In some cases, one or more surfaces of one or more electrodes may become uneven as the electrochemical cell undergoes repeated charge/discharge cycles, often due to uneven redeposition of an ion dissolved in the electrolyte. The roughening of one or more surfaces of one or more electrodes can result in increasingly poor cell performance.

Accordingly, improved compositions and methods are needed.

SUMMARY OF THE INVENTION

The present invention relates generally to electrochemical cells, and, more specifically, to systems and methods for improving the performance of electrochemical cells via the application of force. The subject matter of the present invention involves, in some cases, interrelated products, alternative solutions to a particular problem, and/or a plurality of different uses of one or more systems and/or articles.

In certain embodiments, the invention relates to an electrochemical cell. In one set of embodiments, an electrochemical cell comprising a cathode, an anode comprising lithium as an anode active material, the anode having an active surface, and an electrolyte in electrochemical communication with the cathode and the anode are provided. The cell may be constructed and arranged to apply, during at least one period of time during charge and/or discharge of the cell, an anisotropic force with a component normal to the active surface of the anode.

In some instances, an electrochemical cell comprising a cathode, an anode, the anode having an active surface, and a non-solid electrolyte in electrochemical communication with the cathode and the anode may be provided. The cell may be constructed and arranged to apply, during at least one period of time during charge and/or discharge of the cell, an anisotropic force with a component normal to the active surface of the anode.

In some embodiments, an article is described. The article can comprise an electrochemical cell comprising an inner volume, a first electrode proximate the inner volume, an electrolyte proximate the first electrode, and a second electrode proximate the electrolyte. The article can also comprise an expanding element positioned within the inner volume of the electrochemical cell, and a constricting element surrounding at least a portion of the outside of the electrochemical cell. In some cases, the constricting element is constructed and arranged to apply a force to an outermost surface of the electrochemical cell. In some embodiments, the expanding element is constructed and arranged to apply a force radiating outward from the inner volume of the electrochemical cell. In some cases, the force within the boundaries of the electrochemical cell deviates by less than about 30% of the median force within the boundaries electrochemical cell.

In one set of embodiments, an article comprising a plurality of electrochemical cells is described. The article can comprise a first electrochemical cell, a second electrochemical cell, and a constricting element surrounding at least portions of the first cell and the second cell. In some embodiments, the constricting element can be constructed and arranged to apply a force defining a pressure of at least about 4.9 Newtons/cm$^2$ to the first and second cells.

In some cases, an electrochemical cell comprising a cathode with an active surface, an anode with an active surface, and an electrolyte in electrochemical communication with the cathode and the anode may be provided. The cathode and anode may have yield stresses, wherein the effective yield stress of one of the cathode and anode is greater than the yield stress of the other, such that an anisotropic force applied normal to the surface of one of the active surface of the anode and the active surface of the cathode causes the surface morphology of one of the cathode and the anode to be affected.

In certain embodiments, the invention relates to methods of electrical energy storage and use. In one set of embodiments, the method comprises providing an electrochemical cell comprising a cathode; an anode comprising a lithium anode active material, the anode having an active surface; and an electrolyte in electrochemical communication with the cathode and the anode. The method may further comprise applying, during at least one period of time during charge and/or discharge of the cell, an anisotropic force with a component normal to the active surface of the anode.

In one set of embodiments, the method comprises providing an electrochemical cell comprising a cathode; an anode, the anode having an active surface; and a non-solid electrolyte in electrochemical communication with the cathode and the anode. The method may further comprise applying, during at least one period of time during charge and/or discharge of the cell, an anisotropic force with a component normal to the active surface of the anode.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

The present invention relates to the application of a force to enhance the performance of an electrochemical cell. A force, or forces, applied to portions of an electrochemical cell as described in this application can reduce irregularity or roughening of an electrode surface of the cell, improving performance.

The force may comprise, in some instances, an anisotropic force with a component normal to an active surface of the anode of the electrochemical cell. In the embodiments described herein, electrochemical cells (US01 e.g., rechargeable batteries) may undergo a charge/discharge cycle involving deposition of metal (e.g., lithium metal or other active material as described below) on a surface of the anode upon charging and reaction of the metal on the anode surface, wherein the metal diffuses from the anode surface, upon discharging. The uniformity with which the metal is deposited on the anode may affect cell performance. For example, when lithium metal is removed from and/or redeposited on an anode, it may, in some cases, result in an uneven surface, for example, upon redeposition it may deposit unevenly forming a rough surface. The roughened surface may increase the amount of lithium metal available for undesired chemical reactions which may result in decreased cycling lifetime and/or poor cell performance. The application of force to the electrochemical cell has been found, in accordance with the invention, to reduce such behavior and to improve the cycling lifetime and/or performance of the cell.

Figure 1:
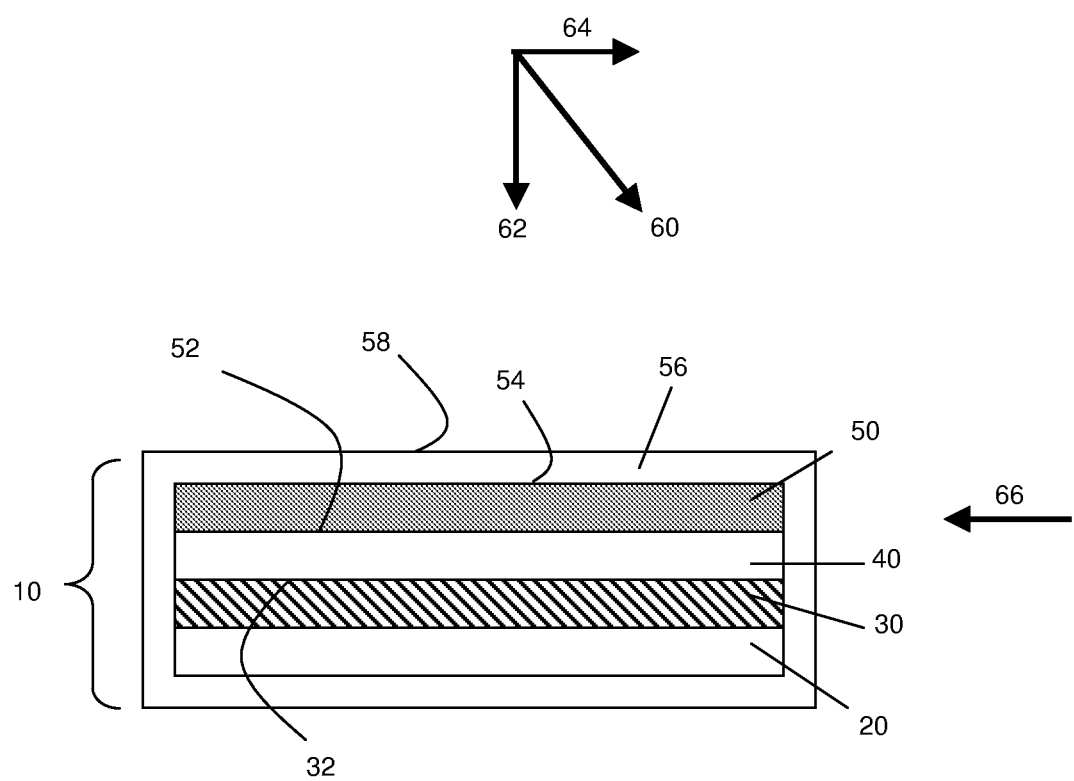
FIG. 1 is a schematic illustration of an electrochemical cell, according to one set of embodiments.

Although the present invention can find use in a wide variety of electrochemical devices, an example of one such device is provided in FIG. 1 for illustrative purposes only. In FIG. 1, a general embodiment of an electrochemical cell can include a cathode, an anode, and an electrolyte layer in electrochemical communication with the cathode and the anode. In some cases, the cell also may comprise a containment structure. The components may be assembled, in some cases, such that the electrolyte is placed between the cathode and anode in a stacked configuration. FIG. 1 illustrates an electrochemical cell of the invention. In the embodiment shown, cell 10 includes a cathode 30 that can be formed on a substantially planar surface of substrate 20. While the cathode and substrate in FIG. 1 are shown as having a planar configuration, other embodiments may include non-planar configurations, as will be discussed in more detail later. The cathode may comprise a variety of cathode active materials. As used herein, the term "cathode active material" refers to any electrochemically active species associated with the cathode. For example, the cathode may comprise a sulfur-containing material, wherein sulfur is the cathode active material. Other examples of cathode active materials are described more fully below. In some embodiments, cathode 30 comprises at least one active surface (e.g., surface 32). As used herein, the term "active surface" is used to describe a surface of an electrode that is in physical contact with the electrolyte and at which electrochemical reactions may take place. An electrolyte 40 (e.g., comprising a porous separator material) can be formed adjacent the cathode 30.

In some embodiments, electrolyte 40 may comprise a non-solid electrolyte, which may or may not be incorporated with a porous separator. As used herein, the term "non-solid" is used to refer to materials that are unable to withstand a static shear stress, and when a shear stress is applied, the non-solid experiences a continuing and permanent distortion. Examples of non-solids include, for example, liquids, deformable gels, and the like. An anode layer 50 can be formed adjacent electrolyte 40 and may be in electrical communication with the cathode 30. Optionally, the cell may also include, in some embodiments, containment structure 56.

The anode may comprise a variety of anode active materials. As used herein, the term "anode active material" refers to any electrochemically active species associated with the anode. For example, the anode may comprise a lithium-containing material, wherein lithium is the anode active material. Other examples of anode active materials are described more fully below. In some embodiments, anode 50 comprises at least one active surface (e.g., surface 52). The anode 50 may also be formed on an electrolyte layer positioned on cathode 30 via electrolyte 40. Of course, the orientation of the components can be varied, and it should be understood that there are other embodiments in which the orientation of the layers is varied such that, for example, the anode layer or the electrolyte layer is first formed on the substrate. Optionally, additional layers (not shown), such as a multi-layer structure that protects an electroactive material (e.g., an electrode) from the electrolyte, may be present, as described in more detail in U.S. patent application Ser. No. 11/400,781, filed Apr. 6, 2006, entitled, "Rechargeable Lithium/Water, Lithium/Air Batteries" to Affinito et al., which is incorporated herein by reference in its entirety. Additionally, non-planar arrangements, arrangements with proportions of materials different than those shown, and other alternative arrangements are useful in connection with the present invention. A typical electrochemical cell also would include, of course, current collectors, external circuitry, housing structure, and the like. Those of ordinary skill in the art are well aware of the many arrangements that can be utilized with the general schematic arrangement as shown in the figures and described herein.

Figure 2:
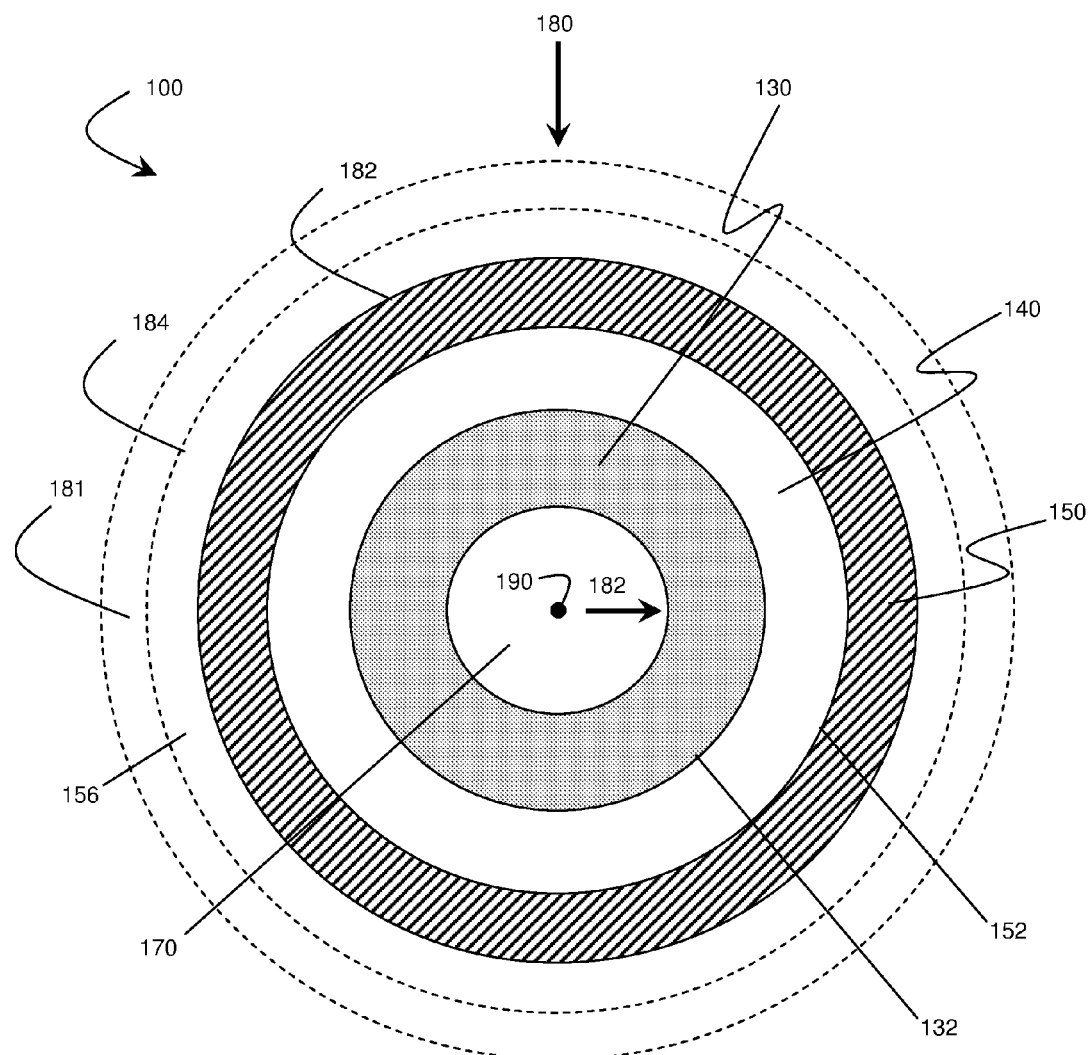
FIG. 2 is a schematic illustration of an electrochemical cell, according to another set of embodiments.

While FIG. 1 illustrates an electrolytic cell arranged in a stacked configuration, it is to be understood that any electrochemical cell arrangement can be constructed, employing the principles of the present invention, in any configuration. For example, FIG. 2 illustrates a cross-sectional view of an electrochemical cell arranged as a cylinder. In the embodiment shown in FIG. 2, cell 100 includes an electrode 130, an electrolyte 140, and electrode 150. In some embodiments, electrode 130 may comprise an anode while electrode 150 may comprise a cathode, while in other embodiments, their order may be reversed. Optionally, the cell may contain a core 170, which may be solid, hollow, or contain a channel or channels. Cell 100 also includes active surfaces 132 and 152. Optionally, the cell may also include, in some embodiments, containment structure 156. As shown in FIG. 2, electrode 130 is formed on core 170, electrolyte 140 is formed on electrode 130, and electrode 150 is formed on electrolyte 140. However, in some embodiments, electrode 130 may be proximate core 170, electrolyte 140 may be proximate electrode 130, and/or electrode 150 may be proximate electrolyte 140, optionally including one or more intervening sections of material between components. In one set of embodiments, electrode 130 may at least partially surround core 170, electrolyte 140 may at least partially surround electrode 130, and/or electrode 150 may at least partially surround electrolyte 140. As used herein, a first entity is "at least partially surrounded" by a second entity if a closed loop can be drawn around the first entity through only the second entity, and does not imply that the first entity is necessarily completely encapsulated by the second entity.

Figure 3:
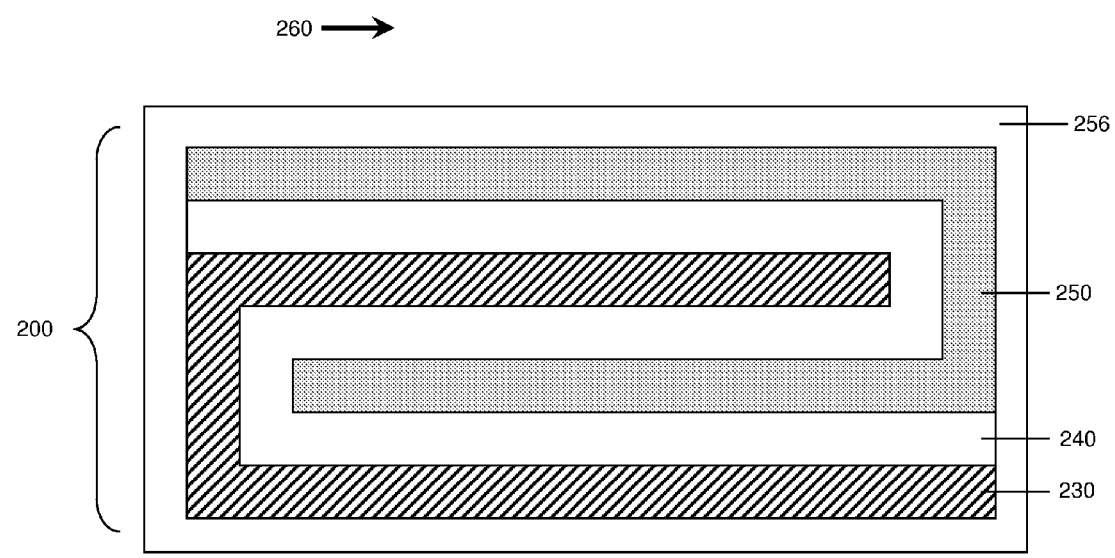
FIG. 3 is a schematic illustration of an electrochemical cell, according to yet another set of embodiments.

In another set of embodiments, illustrated in FIG. 3, the electrochemical cell is in the shape of a folded stack. The cell 200 illustrated in FIG. 3 comprises electrolyte 240 separating anode 230 and cathode 250. The electrochemical cell in FIG. 3 comprises an electrolyte including three folded planes parallel to arrow 260. In other embodiments, electrochemical cells may comprise electrolytes including any number of folded planes parallel to arrow 260. Optionally, the cell may also include, in some embodiments, containment structure 256. In addition to the shapes illustrated in FIGS. 1-3, the electrochemical cells described herein may be of any other shape including, but not limited to, prisms (e.g., triangular prisms, rectangular prisms, etc.), "Swiss-rolls," non-planar stacks, etc. Additional configurations are described in U.S. patent application Ser. No. 11/400,025, filed Apr. 6, 2006, entitled, "Electrode Protection in both Aqueous and Non-Aqueous Electrochemical Cells, including Rechargeable Lithium Batteries," to Affinito et al., which is incorporated herein by reference in its entirety.

As mentioned above, in some embodiments, the present invention relates to electrochemical devices in which the application of force is used to enhance the performance of the device. In some embodiments, the force comprises an anisotropic force with a component normal to the active surface of the anode. In the case of a planar surface, the force may comprise an anisotropic force with a component normal to the surface at the point at which the force is applied. For example, referring to FIG. 1, a force may be applied in the direction of arrow 60. Arrow 62 illustrates the component of the force that is normal to active surface 52 of anode 50. In the case of a curved surface, for example, a concave surface or a convex surface, the force may comprise an anisotropic force with a component normal to a plane that is tangent to the curved surface at the point at which the force is applied. Referring to the cylindrical cell illustrated in FIG. 2, a force may be applied to an external surface of the cell in the direction of, for example, arrow 180. In some embodiments, the force may be applied from the interior of the cylindrical cell, for example, in the direction of arrow 182. In some embodiments, an anisotropic force with a component normal to the active surface of the anode is applied during at least one period of time during charge and/or discharge of the electrochemical cell. In some embodiments, the force may be applied continuously, over one period of time, or over multiple periods of time that may vary in duration and/or frequency. The anisotropic force may be applied, in some cases, at one or more pre-determined locations, optionally distributed over the active surface of the anode. In some embodiments, the anisotropic force is applied uniformly over the active surface of the anode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes a force applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

A force with a "component normal" to a surface, for example an active surface of an anode, is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill can understand other examples of these terms, especially as applied within the description of this document.

In some embodiments, the anisotropic force can be applied such that the magnitude of the force is substantially equal in all directions within a plane defining a cross-section of the electrochemical cell, but the magnitude of the forces in out-of-plane directions is substantially unequal to the magnitudes of the in-plane forces. For example, referring to FIG. 2, a cylindrical band may be positioned around the exterior of cell 100 such that forces (e.g., force 180) are applied to the cell oriented toward the cell's central axis (indicated by point 190 and extending into and out of the surface of the cross-sectional schematic diagram). In some embodiments, the magnitudes of the forces oriented toward the central axis of the cell are different (e.g., greater than) the magnitudes of the forces applied in out of plane directions (e.g., parallel to central axis 190).

In one set of embodiments, cells of the invention are constructed and arranged to apply, during at least one period of time during charge and/or discharge of the cell, an anisotropic force with a component normal to the active surface of the anode. Those of ordinary skill in the art will understand the meaning of this. In such an arrangement, the cell may be formed as part of a container which applies such a force by virtue of a "load" applied during or after assembly of the cell, or applied during use of the cell as a result of expansion and/or contraction of one or more portions of the cell itself.

The magnitude of the applied force is, in some embodiments, large enough to enhance the performance of the electrolytic cell. The anode active surface and the anisotropic force may be, in some instances, together selected such that the anisotropic force affects surface morphology of the anode active surface to inhibit increase in anode active surface area through charge and discharge and wherein, in the absence of the anisotropic force but under otherwise essentially identical conditions, the anode active surface area is increased to a greater extent through charge and discharge cycles. "Essentially identical conditions," in this context, means conditions that are similar or identical other than the application and/or magnitude of the force. For example, otherwise identical conditions may mean a cell that is identical, but where it is not constructed (e.g., by brackets or other connections) to apply the anisotropic force on the subject cell.

The anode active surface and anisotropic force can be selected together, to achieve results described herein, easily by those of ordinary skill in the art. For example, where the anode active surface is relatively softer, the component of the force normal to the anode active surface may be selected to be lower. Where the anode active surface is harder, the component of the force normal to the active surface may be greater. Those of ordinary skill in the art can easily select anode materials, alloys, mixtures, etc. with known or predictable properties, or readily test the hardness or softness of such surfaces, and readily select cell construction techniques and arrangements to provide appropriate forces to achieve what is described herein. Simple testing can be done, for example by arranging a series of active materials, each with a series of forces applied normal (or with a component normal) to the active surface, to determine the morphological effect of the force on the surface without cell cycling (for prediction of the selected combination during cell cycling) or with cell cycling with observation of a result relevant to the selection.

In some embodiments, an anisotropic force with a component normal to the active surface of the anode is applied, during at least one period of time during charge and/or discharge of the cell, to an extent effective to inhibit an increase in surface area of the anode active surface relative to an increase in surface area absent the anisotropic force. The component of the anisotropic force normal to the anode active surface may, for example, define a pressure of at least about 4.9, at least about 9.8, at least about 24.5, at least about 49, at least about 98, at least about 117.6, or at least about 147 Newtons per square centimeter. In some embodiments, the component of the anisotropic force normal to the anode active surface may, for example, define a pressure of less than about 196, less than about 147, less than about 117.6, less than about 98, less than about 49, less than about 24.5, or less than about 9.8 Newtons per square centimeter. In some cases, the component of the anisotropic force normal to the anode active surface is may define a pressure of between about 4.9 and about 147 Newtons per square centimeter, between about 49 and about 117.6 Newtons per square centimeter, or between about 68.6 and about 98 Newtons per square centimeter. While forces and pressures are generally described herein in units of Newtons and Newtons per unit area, respectively, forces and pressures can also be expressed in units of kilograms-force and kilograms-force per unit area, respectively. One or ordinary skill in the art will be familiar with kilogram-force-based units, and will understand that 1 kilogram-force is equivalent to about 9.8 Newtons.

In some cases, one or more forces applied to the cell have a component that is not normal to an active surface of an anode. For example, in FIG. 1, force 60 is not normal to anode active surface 52, and force 60 includes component 64, which is substantially parallel to anode active surface 52. In addition, a force 66, which is substantially parallel to anode active surface 52, could be applied to the cell in some cases. In one set of embodiments, the sum of the components of all applied anisotropic forces in a direction normal to the anode active surface is larger than any sum of components in a direction that is non-normal to the anode active surface. In some embodiments, the sum of the components of all applied anisotropic forces in a direction normal to the anode active surface is at least about 5%, at least about 10%, at least about 20%, at least about 35%, at least about 50%, at least about 75%, at least about 90%, at least about 95%, at least about 99%, or at least about 99.9% larger than any sum of components in a direction that is parallel to the anode active surface.

In some embodiments, the cathode and anode have yield stresses, wherein the effective yield stress of one of the cathode and anode is greater than the yield stress of the other, such that an anisotropic force applied normal to the surface of one of the active surface of the anode and the active surface of the cathode causes the surface morphology of one of the cathode and the anode to be affected. In some embodiments, the component of the anisotropic force normal to the anode active surface is between about 20% and about 200% of the yield stress of the anode material, between about 50% and about 120% of the yield stress of the anode material, or between about 80% and about 100% of the yield stress of the anode material.

The anisotropic force described herein may be applied using any method known in the art. In some embodiments, the force may be applied using compression springs. For example, referring to FIG. 1, electrolytic cell 10 may be situated in an optional enclosed containment structure 56 with one or more compression springs situated between surface 54 and the adjacent wall of the containment structure to produce a force with a component in the direction of arrow 62. In some embodiments, the force may be applied by situating one or more compression springs outside the containment structure such that the spring is located between an outside surface 58 of the containment structure and another surface (e.g., a tabletop, the inside surface of another containment structure, an adjacent cell, etc.). Forces may be applied using other elements (either inside or outside a containment structure) including, but not limited to Belleville washers, machine screws, pneumatic devices, and/or weights, among others. For example, in one set of embodiments, one or more cells (e.g., a stack of cells) are arranged between two plates (e.g., metal plates). A device (e.g., a machine screw, a spring, etc.) may be used to apply pressure to the ends of the cell or stack via the plates. In the case of a machine screw, for example, the cells may be compressed between the plates upon rotating the screw. As another example, in some embodiments, one or more wedges may be displaced between a surface of the cell (or the containment structure surrounding the cell) and a fixed surface (e.g., a tabletop, the inside surface of another containment structure, an adjacent cell, etc.). The anisotropic force may be applied by driving the wedge between the cell and the adjacent fixed surface through the application of force on the wedge (e.g., by turning a machine screw).

In some cases, cells may be pre-compressed before they are inserted into containment structures, and, upon being inserted to the containment structure, they may expand to produce a net force on the cell. For example, the cylindrical cell of FIG. 2 could be pre-compressed and inserted within containment structure 156. The containment structure could then provide a force to the outside surface of the cylindrical cell upon expansion of the cell. Such an arrangement may be advantageous, for example, if the cylindrical cell is capable of withstanding relatively high variations in pressure. In such embodiments, the containment structures may comprise a relatively high strength (e.g., at least about 100 MPa, at least about 200 MPa, at least about 500 MPa, or at least about 1 GPa). In addition, the containment structure may comprise a relatively high elastic modulus (e.g., at least about 10 GPa, at least about 25 GPa, at least about 50 GPa, or at least about 100 GPa). The containment structure may comprise, for example, aluminum, titanium, or any other suitable material.

In some cases, any of the forces described herein may be applied to a plurality of electrochemical cells in a stack. As used herein, a "stack" of electrochemical cells is used to refer to a configuration in which multiple cells are arranged in an essentially cell-repetitive pattern, e.g., positioned on top of one another. In some cases, the cells may be positioned such that at least one surface of each cell in the stack is substantially parallel to at least one surface of every other cell in the stack, e.g., where a surface of one particular component (e.g., the anode) of one cell is substantially parallel to the same surface of the same component of every other cell. For example, FIG. 8 includes a schematic illustration of a stack of electrochemical cells 10. In some embodiments, the cells may be in direct contact with one another, while in some instances one or more spacers may be positioned between the cells in a stack. The stack of electrochemical cells may comprise any number of cells (e.g., at least 2, at least 3, at least 5, at least 10, at least 25, at least 100 cells, or more).

In some embodiments, a constricting element may surround at least a portion of a cell or a stack of cells. The constricting element may be constructed and arranged, in some cases, to apply an anisotropic force with a component normal to at least one anode active surface within the cell or stack of cells defining a pressure of at least about 4.9, at least about 9.8, at least about 24.5, at least about 49, at least about 98, at least about 117.6, at least about 147, less than about 196, less than about 147, less than about 117.6, less than about 98, less than about 49, less than about 24.5, less than about 9.8, between about 4.9 and about 147, between about 49 and about 117.6, or between about 68.6 and about 98 Newtons per square centimeter.

Figure 8:
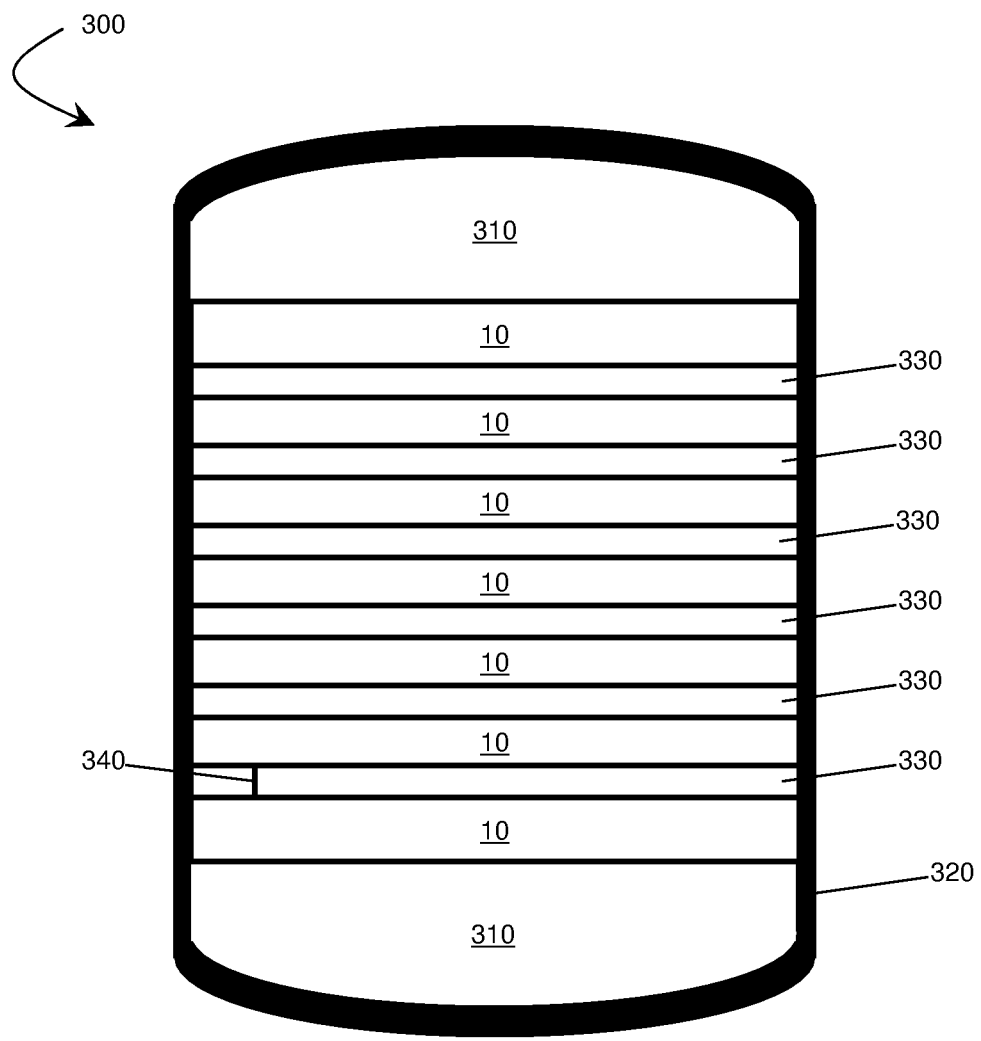
FIG. 8 is a schematic illustration of an electrochemical cell stack, according to another embodiment.

In some embodiments, the constricting element may comprise a band (e.g., a rubber band, a turnbuckle band, etc.). An exemplary embodiment employing a constricting element is illustrated in FIG. 8. In this set of embodiments, a constricting element 320 surrounds a stack of cells 10. In some embodiments, a band can be affixed to the cell or stack of cells by, for example adhesive, staples, clamps, a turn-buckle, or any other suitable method. In some cases, the band comprises a turnbuckle band (e.g., a Kevlar turnbuckle band), and force is applied by tightening the band and securing the turnbuckle. In some instances, the band is a continuous elastic band. In some cases, after the elastic band is stretched and positioned around the cell(s), a force may be applied via the elastic constriction of the band. As a specific example, a band can be installed by cooling the band material below its martensitic transformation temperature and plastically deforming (e.g., via stretching) the band to fit over the cell or stack of cells. Upon returning to operating temperature, the band could then shrink to its pre-formed shape, by which the band could apply a force.

The constricting element may comprise any material with an amount of elasticity necessary to produce the desired force. A solid band of elastic material can be sized such that it provides required external pressure upon being applied to the outer surface of the cell or cells and relaxing. In some cases, the constricting element may comprise a polymeric material. The constricting element may comprise, for example, Desmopan 392 (a polyester urethane, made by Bayer MaterialScience, Leverkusen, Germany), Estane® (an engineered polymer made by The Lubrizol Corporation, Wickliffe, Ohio), Kevlar (a synthetic fiber made by DuPont, Wilmington, Del.), among others. In some embodiments, the constricting element may comprise a shape memory alloy (e.g., nitinol (NiTi)), which may expand and contract upon varying the temperature to which the material is exposed. In some cases, the constricting element can comprise shrink wrap tubing such as, for example, polyester film and/or fabric.

In some embodiments, the mass density of the elements used to apply a force to a cell or a stack of cells (e.g., a constricting element, an expanding element, etc.) is relatively low. By using elements with relatively low mass densities, the energy density and specific energy of the cell or stack of cells may remain relatively high. In some embodiments the mass density of the article(s) used to apply a force to a cell or a stack of cells is less than about 10 $g/cm^3$, less than about 5 $g/cm^3$, less than about 3 $g/cm^3$, less than about 1 $g/cm^3$, less than about 0.5 $g/cm^3$, less than about 0.1 $g/cm^3$, between about 0.1 $g/cm^3$ and about 10 $g/cm^3$, between about 0.1 $g/cm^3$ and about 5 $g/cm^3$, or between about 0.1 $g/cm^3$ and about 3 $g/cm^3$.

In some embodiments, pressure distribution components may be included between a cell and another cell or between a cell and a constricting element. Such pressure distribution components can allow for a uniform force to be applied throughout the cell or stack of cells. In some cases, the pressure distribution components comprise an end cap. The end caps' shape can be selected so as to convert the linear forces applied by the band to a uniform force across, for example, the active area of an anode. For example, in FIG. 8, optional caps 310 may be placed between the ends of the stack and the band. The caps shown in FIG. 8 include rounded ends, which may, for example, be used to reduce separation of the band from the stack at corners and edges and enhance the uniformity of the distribution of force. The caps can comprise any suitable material including, for example, metal (e.g., aluminum), carbon fiber, plastics, etc. In some embodiments, the end caps are relatively easy to form or machine into complex shapes.

In some embodiments, the mass density of the end caps may be relatively low. For example, the end caps may have a mass density of less than about 5 $g/cm^3$, less than about 3 $g/cm^3$, less than about 1 $g/cm^3$, less than about 0.5 $g/cm^3$, less than about 0.1 $g/cm^3$, between about 0.1 $g/cm^3$ and about 10 $g/cm^3$, between about 0.1 $g/cm^3$ and about 5 $g/cm^3$, or between about 0.1 $g/cm^3$ and about 3 $g/cm^3$. In addition, the end caps may comprise any suitable stiffness. For example, the stiffness of the end caps may be higher than 50 GPa, in some embodiments.

Another example of a pressure distribution component comprises a spacer positioned between two cells. Inter-cell spacers can serve to reduce stress concentrations that may arise, for example, due to geometrical manufacturing variations of individual cells. For example, the flatness of the cells may vary from cell to cell. As another example, opposing sides of one or more cells may not be perfectly parallel in some cases. In the set of embodiments illustrated in FIG. 8, optional spacers 330 have been inserted between cells 10. Spacers can comprise any suitable material including, for example, metal (e.g., aluminum), metal foams, carbon composites, carbon foams, plastics, etc. In some embodiments, the spacers are relatively easy to form or machine into complex shapes.

A spacer can also have any suitable thickness. In some cases, a spacer may have an average thickness of less than about 10 mm, less than about 5 mm, less than about 1 mm, less than about 500 microns, or less than about 250 microns. In some embodiments, a spacer can be between about 100 microns and about 10 mm, between about 100 microns and about 1 mm, between about 250 microns and about 10 mm, between about 250 microns and about 1 mm, or between about 500 microns and about 2 mm.

Opposing faces of the spacer(s) may be highly parallel, in some embodiments. For example, in some embodiments, the variation of the distance between a first surface of a spacer in contact with a first cell and a second surface of the spacer in contact with a second cell, as measured substantially parallel to a vector drawn from the center of mass of the first cell to the center of mass of the second cell (e.g., as in line 340 in FIG. 8), across the width of the spacer is less than about 1 mm, less than about 500 microns, less than about 100 microns, less than about 50 microns, less than about 25 microns, less than about 10 microns, or less than about 1 micron.

The mass density of the spacer(s) in a stack of cells can be relatively low, in some instances. For example, the spacers may have a mass density of less than about 5 g/cm$^3$, less than about 2 g/cm$^3$, less than about 1 g/cm$^3$, less than about 0.5 g/cm$^3$, less than about 0.1 g/cm$^3$, between about 0.1 g/cm$^3$ and about 10 g/cm$^3$, between about 0.1 g/cm$^3$ and about 5 g/cm$^3$, or between about 0.1 g/cm$^3$ and about 2 g/cm$^3$. In addition, the end caps may comprise a relatively high stiffness. For example, the stiffness of the spacer(s) may be higher than 10 GPa, in some embodiments.

One of ordinary skill in the art will be able to perform experiments to determine appropriate sizes, shapes, and materials of construction for the end cap(s) or spacer(s) to be used with a cell or stack of cells. For example, if the end cap or spacer material is sufficiently stiff, a simple geometric optimization of the shape may be sufficient to determine their properties. In other cases, more complex stress/strain calculations may be required to ensure the pressure distribution is substantially uniform after the end caps and/or spacers have equilibrated to their final deformed shape.

The use of constriction elements is not limited to flat cell geometries. In some instances, a constriction element may be used to apply a force to a cylindrical electrochemical cell or a prismatic electrochemical cell (e.g., a triangular prism, a rectangular prism, etc.). For example, in the set of embodiments in FIG. 2, optional constricting element 181 can be positioned around the cell such that it surrounds at least a portion of the outside of the electrochemical cell. The constriction element may be used to apply a force to the outermost surface of the electrochemical cell (e.g., surface 182 or surface 184 in FIG. 2).

Any of the constriction elements described above may be used as constriction elements in cylindrical cells, prismatic cells, or other such cells. For example, in some embodiments, one or more wraps of the same or different winding material may be positioned on the outside surface of the cell. In some embodiments, the winding material comprises relatively high strength. The winding material may also comprise a relatively high elastic modulus. In some cases, shrink wrap tubing such as polyester film and fabric. In some cases, the constriction element comprises an elastic material properly sized to provide required external pressure after it relaxes on the outer surface of the cell.

In some embodiments, the cell may comprise an expanding element (e.g., an expanding mandrel) within an inner volume of the cell such (e.g., hollow core 170 in FIG. 2). The expanding element can be constructed and arranged to apply a force radiating outward from the inner volume of the electrochemical cell, such as, for example, in the direction of arrow 182 in FIG. 2, In some embodiments, the expanding element and the constricting element can be constructed and arranged such that the force within the boundaries of the electrochemical cell deviates by less than about 30%, less than about 20%, less than about 10%, or less than about 5% of the median force within the boundaries electrochemical cell. In some embodiments, such a distribution of forces can be achieved, for example, by selecting constricting and expanding elements such that substantially equal internal and external forces per unit area are applied to the cell.

In some embodiments, rather than applying internal pressure, external pressure application can be combined with complimentary winding mechanics to achieve a radial pressure distribution that is within acceptable bounds. For example, proper surface nip winding (e.g., using a nip roller) can produce a radial pressure distribution varying from 107.9 Newtons/cm$^2$ at the inner diameter to 0 Newtons/cm$^2$ at the outer diameter of the cell. The contracting element may be constructed and arranged to produce a force of 0 Newtons/cm$^2$ at the inner diameter and 78.5 Newtons/cm$^2$ at the outer diameter. The superposition of these two distributions can result in a mean pressure application of 98 Newtons/cm$^2$ with a variation of ±19.6 Newtons/cm$^2$. In some embodiments, the total volumes of the pressure distribution elements(s) (e.g., end caps, spacers, etc.) and the element(s) used to apply a force to the cell or stack of cells (e.g., bands, mandrels, etc.) may be relatively low. By employing low volumes, the energy density of the assembly may be kept relatively high. In some cases, the sum of the volumes of the pressure distribution element(s) and the element(s) used to apply a force to a cell or stack of cells comprises less than about 10%, less than about 5%, less than about 2%, less than about 1%, less than about 0.5%, less than about 0.1%, between about 0.1% and about 10%, between about 0.1% and about 5%, between about 0.1% and about 2%, or between about 0.1% and about 1% of the volume of the cell or stack of cells.

In some cases, the cells described herein may change size (e.g., swell) during charge and discharge. When selecting the method of applying the anisotropic force, it may be desirable, in some embodiments, to select methods that produce a relatively constant force as the cell changes shape and/or size during charge and discharge. In some instances, this selection may be analogous to selecting a system with a low effective spring constant (e.g., a "soft" spring). For example, when using a compression spring to apply the anisotropic force, a spring with a relatively low spring constant may produce an anisotropic force that is more constant during cell cycling than the force produced by a spring with a relatively high spring constant. In cases where elastic bands are used, a band with a relatively high elasticity may produce an anisotropic force that is more constant during cell cycling than the force produced by a band with a relatively low elasticity. In some embodiments in which force is applied using a machine screw, the use of soft screws (e.g., brass, polymer, etc.) may be advantageous. In some applications, for example, a machine screw may be selected to cover a desired range of compression, but the screw itself may be soft.

In some embodiments, the electrolytic cells of the present invention are placed in containment structures, and at least a portion of an anisotropic force with a component normal to the active surface of the anode is produced due to the expansion of the electrolytic cell relative to the containment structure. In some cases, the containment structure is sufficiently rigid such that it does not deform during the expansion of the electrolytic cell, resulting in a force applied on the cell. The electrolytic cell may swell as the result of a variety of phenomena. For example, in some cases, the electrolytic cell may undergo thermal expansion. In some embodiments, the electrolytic cell may swell due to charge and/or discharge of the cell. For example, in some cases, a partially discharged cell may be placed in a containment structure. Upon charging the partially discharged cell, the cell may swell. This expansion may be limited by the dimensions of the containment structure, resulting in the application of an anisotropic force.

In some cases, the cell may swell due to the adsorption of a liquid into porous components of the electrolytic cell. For example, in some embodiments, a dry porous electrolytic cell may be placed within a containment structure. The dry porous electrolytic cell may then be soaked (e.g., with a liquid electrolyte). In some cases, the properties of the electrolyte (e.g., surface tension) and the electrolytic cell (e.g., size of the porous cavities) may be selected such that, when the electrolytic cell is wetted by the electrolyte, a desirable level of capillary pressure is generated. Once wetted, the electrode stack will swell, thus generating an anisotropic force. At equilibrium, the anisotropic force exerted by the containment structure on the electrolytic cell will be equal to the force resulting from the capillary pressure.

Containment structures described herein may comprise a variety of shapes including, but not limited to, cylinders, prisms (e.g., triangular prisms, rectangular prisms, etc.), cubes, or any other shape. In some embodiments, the shape of the containment structure is chosen such that the walls of the containment structure are parallel to the outer surfaces of the electrolytic cell. For example, in some cases, the containment structure may comprise a cylinder, which can be used, for example, to surround and contain a cylindrical electrolytic cell. In other instances, the containment structure may comprise a prism surrounding a similarly shaped prismatic electrolytic cell.

In some embodiments, the invention relates to the discovery that the application of a force as described herein may allow for the use of smaller amounts of anode active material (e.g., lithium) and/or electrolyte within an electrochemical cell, relative to the amounts used in essentially identical cells in which the force is not applied. In cells lacking the applied force described herein, anode active material (e.g., lithium metal) may be, in some cases, redeposited unevenly on an anode during charge-discharge cycles of the cell, forming a rough surface. In some cases, this may lead to an increase in the rates of one or more undesired reactions involving the anode metal. These undesired reactions may, after a number of charge-discharge cycles, stabilize and/or begin to self-inhibit such that substantially no additional anode active material becomes depleted and the cell may function with the remaining active materials. For cells lacking the applied force as described herein, this "stabilization" is often reached only after a substantial amount of anode active material has been consumed and cell performance has deteriorated. Therefore, in some cases where forces as described herein have not been applied, a relatively large amount of anode active material and/or electrolyte has often been incorporated within cells to accommodate for loss of material during consumption of active materials, in order to preserve cell performance.

Accordingly, the application of force as described herein may reduce and/or prevent depletion of active materials such that the inclusion of large amounts of anode active material and/or electrolyte within the electrochemical cell may not be necessary. For example, the force may be applied to a cell prior to use of the cell, or in an early stage in the lifetime of the cell (e.g., less than five charge-discharge cycles), such that little or substantially no depletion of active material may occur upon charging or discharging of the cell. By reducing and/or eliminating the need to accommodate for active material loss during charge-discharge of the cell, relatively small amounts of anode active material may be used to fabricate cells and devices as described herein. In some embodiments, the invention relates to devices comprising an electrochemical cell having been charged and discharged less than five times in its lifetime, wherein the cell comprises an anode, a cathode, and an electrolyte, wherein the anode comprises no more than five times the amount of anode active material which can be ionized during one full discharge cycle of the cell. In some cases, the anode comprises no more than four, three, two, or 1.5 times the amount of lithium which can be ionized during one full discharge cycle of the cell.

In some cases, the present invention relates to devices comprising an electrochemical cell, wherein the cell comprises an anode active material, a cathode active material, and an electrolyte, wherein the ratio of the amount of anode active material in the anode to the amount of cathode active material in the cathode is less than about 5:1, less than about 3:1, less than about 2:1, or less than about 1.5:1 on a molar basis. For example, a cell may comprise lithium as an anode active material and sulfur as an cathode active material, wherein the molar ratio Li:S is less than about 5:1. In some cases, the molar ratio of lithium to sulfur, Li:S, is less than about 3:1, less than about 2:1, or less than about 1.5:1. In some embodiments, the ratio of anode active material (e.g., lithium) to cathode active material by weight may be less than 2:1, less than about 1.5:1, less than about 1.25:1, or less than about 1.1:1. For example, a cell may comprise lithium as the anode active material and sulfur as the cathode active material, wherein the ratio Li:S by weight is less than about 2:1, less than about 1.5:1, less than about 1.25:1, or less than about 1.1:1.

The use of smaller amounts of anode active material and/or electrolyte material may advantageously allow for electrochemical cells, or portions thereof, having decreased thickness. In some embodiments, the anode layer and the electrolyte layer together have a maximum thickness of 500 microns. In some cases, the anode layer and the electrolyte layer together have a maximum thickness of 400 microns, 300 microns, 200 microns, or, in some cases, 100 microns.

In some embodiments, the application of force, as described herein, may result in improved capacity after repeated cycling of the electrochemical cell. For example, in some embodiments, after alternatively discharging and charging the cell three times, the cell exhibits at least about 50%, at least about 80%, at least about 90%, or at least about 95% of the cell's initial capacity at the end of the third cycle. In some cases, after alternatively discharging and charging the cell ten times, the cell exhibits at least about 50%, at least about 80%, at least about 90%, or at least about 95% of the cell's initial capacity at the end of the tenth cycle. In still further cases, after alternatively discharging and charging the cell twenty-five times, the cell exhibits at least about 50%, at least about 80%, at least about 90%, or at least about 95% of the cell's initial capacity at the end of the twenty-fifth cycle.

Suitable electroactive materials for use as cathode active materials in the cathode of the electrochemical cells of the invention include, but are not limited to, electroactive transition metal chalcogenides, electroactive conductive polymers, sulfur, carbon and/or combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, electroactive materials for use as cathode active materials in electrochemical cells described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In some embodiments, the cathode may comprise one or more binder materials (e.g., polymers, porous silica sol-gel, etc.).

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al. of the common assignee, and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

In one embodiment, an electroactive sulfur-containing material of a cathode active layer comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The cathode active layers of the present invention may comprise from about 20 to 100% by weight of electroactive cathode materials (e.g., as measured after an appropriate amount of solvent has been removed from the cathode active layer and/or after the layer has been appropriately cured). In one embodiment, the amount of electroactive sulfur-containing material in the cathode active layer is in the range of 5-30% by weight of the cathode active layer. In another embodiment, the amount of electroactive sulfur-containing material in the cathode active layer is in the range of 20% to 90% by weight of the cathode active layer.

Non-limiting examples of suitable liquid media (e.g., solvents) for the preparation of cathodes (as well as other components of cells described herein) include aqueous liquids, non-aqueous liquids, and mixtures thereof. In some embodiments, liquids such as, for example, water, methanol, ethanol, isopropanol, propanol, butanol, tetrahydrofuran, dimethoxyethane, acetone, toluene, xylene, acetonitrile, cyclohexane, and mixtures thereof can be used. Of course, other suitable solvents can also be used as needed.

Positive electrode layers may be prepared by methods known in the art. For example, one suitable method comprises the steps of: (a) dispersing or suspending in a liquid medium the electroactive sulfur-containing material, as described herein; (b) optionally adding to the mixture of step (a) a conductive filler and/or binder; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode active layer.

In some embodiments, the use of a cathode that is resistant to compression can enhance the performance of the cell relative to cells in which the cathode is significantly compressible. Not wishing to be bound by any theory, the use of elastic, relatively highly compressible cathodes may result in the evacuation of liquid electrolyte during the application of the anisotropic force. The evacuation of liquid electrolyte from the cathode may result in decreased power output during the operation of the electrolytic cell. For example, in some cases a decrease in power output from the electrolytic cell may be observed even when the anisotropic force is relatively small (e.g., an anisotropic force with a component normal to an active surface of the anode defining a pressure of about 68.6 Newtons/cm$^2$) or when the anisotropic force is of another magnitude, for example, as noted above with reference to limits and ranges of the component of the anisotropic force normal to the anode active surface. The degree of compressibility can be correlated to a change in porosity, i.e., change in void volume of the cathode, during application of a compressive force. In some embodiments, it may be desirable to limit the change in porosity of the cathode during the operation of the cell. For example, in some embodiments of the invention, the porosity of the cathode may be decreased during operation of the cell by less than 10%, less than 6%, less than 4%, less than 2%, less than 1%, less than 0.5%, less than 0.1%, or lower. That is, during use of the cell, a compressive force experienced by the cathode may reduce the total void volume, or total volume otherwise accessible by the electrolyte, by percentages noted above, where the cathode is fabricated to provide suitable resistance to compression.

The stiffness of the cathode (resistance to compressibility) may be enhanced using a variety of methods. In some embodiments, the type of electrolyte and the size of the pores in the cathode may be together selected such that the resulting capillary forces produced by the interaction of the electrolyte and the cathode pores resist the deformation of the cathode. This effect may be particularly useful, for example, in small electrolytic cells. As another example, the stiffness of the cathode may be enhanced by incorporating reinforcement fibers (e.g., to connect carbon particles) into the cathode. In some cases, binder may be incorporated into the cathode to provide rigidity. In other embodiments, an inherently rigid cathode may be produced by infusing active material (e.g., reticulated Ni foam) into a thin and light superstructure.

Suitable electroactive materials for use as anode active materials in the anode of the electrochemical cells described herein include, but are not limited to, lithium metal such as lithium foil and lithium deposited onto a conductive substrate, and lithium alloys (e.g., lithium-aluminum alloys and lithium-tin alloys). While these are preferred negative electrode materials, the current collectors may also be used with other cell chemistries. In some embodiments, the anode may comprise one or more binder materials (e.g., polymers, etc.).

Methods for depositing a negative electrode material (e.g., an alkali metal anode such as lithium) onto a substrate may include methods such as thermal evaporation, sputtering, jet vapor deposition, and laser ablation. Alternatively, where the anode comprises a lithium foil, or a lithium foil and a substrate, these can be laminated together by a lamination process as known in the art to form an anode.

In one embodiment, an electroactive lithium-containing material of an anode active layer comprises greater than 50% by weight of lithium. In another embodiment, the electroactive lithium-containing material of an anode active layer comprises greater than 75% by weight of lithium. In yet another embodiment, the electroactive lithium-containing material of an anode active layer comprises greater than 90% by weight of lithium.

Positive and/or negative electrodes may optionally include one or more layers that interact favorably with a suitable electrolyte, such as those described in U.S. Provisional Application Ser. No. 60/872,939, filed Dec. 4, 2006 and entitled "Separation of Electrolytes," by Mikhaylik et al., which is incorporated herein by reference in its entirety.

The electrolytes used in electrochemical or battery cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Heterogeneous electrolyte compositions that can be used in batteries described herein are described in U.S. Provisional Application Ser. No. 60/872,939, filed Dec. 4, 2006.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

In some cases, aqueous solvents can be used as electrolytes for lithium cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al.

In some embodiments, electrochemical cells may further comprise a separator interposed between the cathode and anode. The separator may be a solid non-conductive or insulative material which separates or insulates the anode and the cathode from each other preventing short circuiting, and which permits the transport of ions between the anode and the cathode. In some embodiments, the porous separator may be perrmeable to the electrolyte.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

The following applications are each incorporated herein by reference in their entirety: U.S. Provisional Patent Application Ser. No. 61/086,329, filed Aug. 5, 2008, entitled "Application of Force in Electrochemical Cells," by Scordilis-Kelley, et al.

The following examples are intended to illustrate certain embodiments of the present invention, but do not exemplify the full scope of the invention.

EXAMPLE 1

In this example, an anisotropic force with a component normal to the active surface of an anode is applied to an electrochemical cell during at least one period of time during charge and/or discharge of the cell. The anode active surface and the anisotropic force were together selected such that the anisotropic force affected the surface morphology of the anode active surface to inhibit increase in anode active surface area through charge and discharge. As illustrated in Example 2, in the absence of the anisotropic force but under otherwise essentially identical conditions, the anode active surface area is increased to a greater extent through charge and discharge cycles.

In this example, lithium metal (>99.9% Li, 2 mil thick foil available from Chemetall-Foote Corp., Kings Mountain, N.C.) was used as the anode. The electrolyte comprised 13.2 parts of lithium bis(trifluoromethane sulfonyl)imide, (lithium imide available from 3M Corporation, St. Paul, Minn.), 1.1 parts lithium nitrate (available from Aldrich Chemical Company, Milwaukee, Wis.) in 1,3-dioxolane, with water content of less than 50 ppm. The porous separator used was 16 μm SETELA (a trademark for a polyolefin separator available from Tonen Chemical Corporation, Tokyo, Japan, and also available from Exxon Mobil Chemical Company, Films Division, Pittsford, N.Y.).

The above components were stacked into a layered structure of anode/separator/anode, with the liquid electrolyte filling the void areas of the separator to form prismatic cells with an electrode area of about 16 cm$^2$. After sealing in an aluminized flexible packaging (from Sumitomo), the cells were stored for 24 hours and placed between steel plates with compression springs. The cell was constructed and arranged to apply, during at least one period of time during charge and/or discharge of the cell, an anisotropic force with a component normal to the active surface of the anode. In this example, the anisotropic force defined a pressure of 98 Newtons/cm$^2$.

Figure 4:
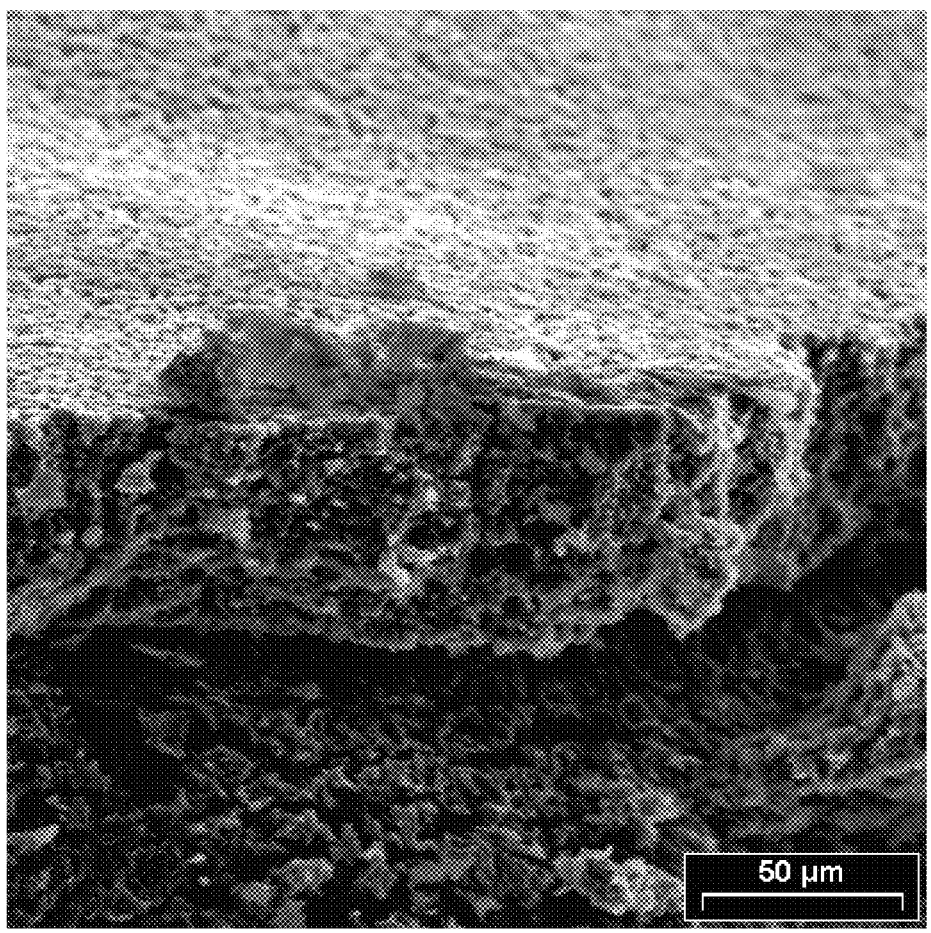
FIG. 4 is an SEM micrograph of an anode after the application of an anisotropic force during charge and discharge.

Discharge-charge cycling on these cells was performed 30 times at 18 mA for 4 hours, both discharge and charge (constant capacity cycling equivalent to 41.5% Li DOD). The cells were then disassembled and the electrodes' morphology evaluated by a scanning electron microscope and residual metallic lithium measured by differential scanning calorimetry. FIG. 4 includes an SEM micrograph of a lithium anode after the application of 98 Newtons/cm$^2$ over 30 cycles. The resulting anodes were compact had retained their original thickness and were composed primarily of lithium metal.

EXAMPLE 2

In this example, an electrochemical cell identical to the cell employed in Example 1 was charged and discharged. In this example, the electrochemical cell was charged and discharged in the absence of the anisotropic force. In addition, the conditions under which the cell was operated were essentially identical to those outlined in Example 1.

Figure 5:
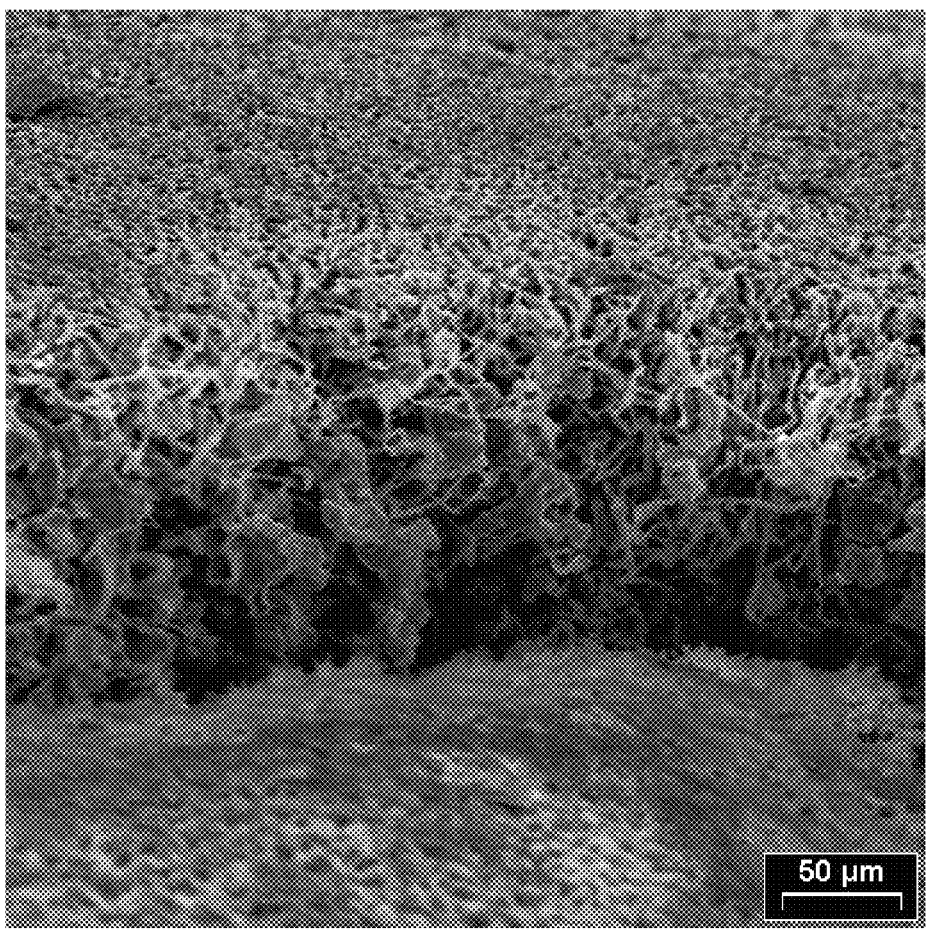
FIG. 5 is an SEM micrograph of an anode after charge and discharge in the absence of an isotropic force.
Figure 6A:
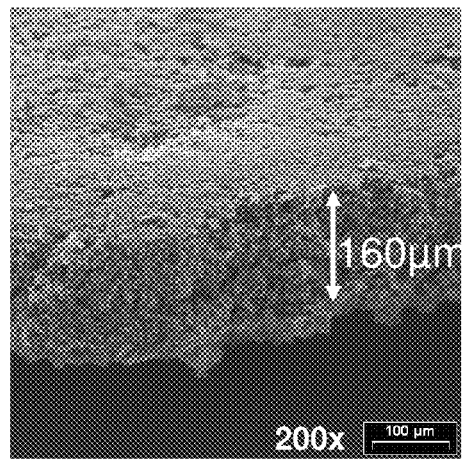
FIGS. 6A-6D include SEM micrographs of anodes after the application of (a) 0, (b) 49, (c) 73.5, and (d) 98 Newtons/$cm^2$ during charge and discharge.
Figure 6B:
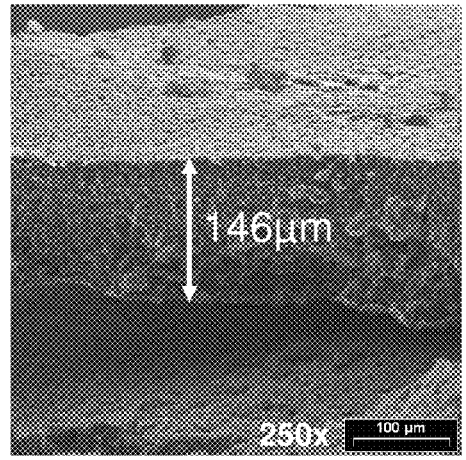
Figure 6C:
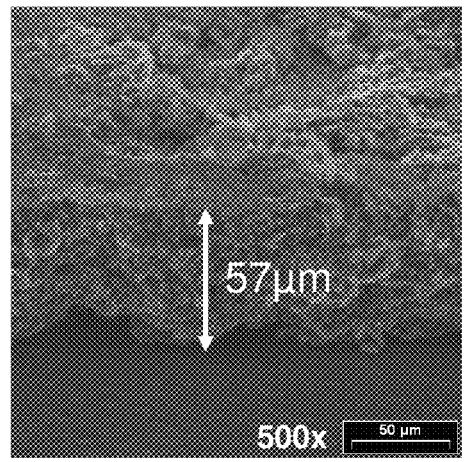
Figure 6D:
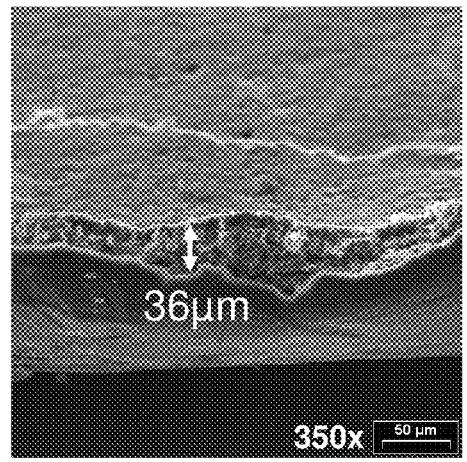
Figure 7A:
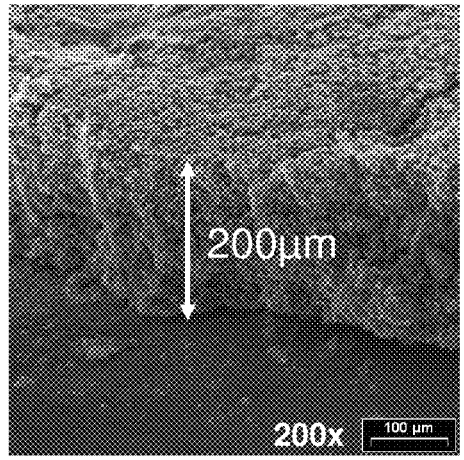
FIGS. 7A-7D include SEM micrographs of anodes after the application of (a) 0, (b) 49, (c) 73.5, and (d) 98 Newtons/$cm^2$ during charge and discharge.
Figure 7B:
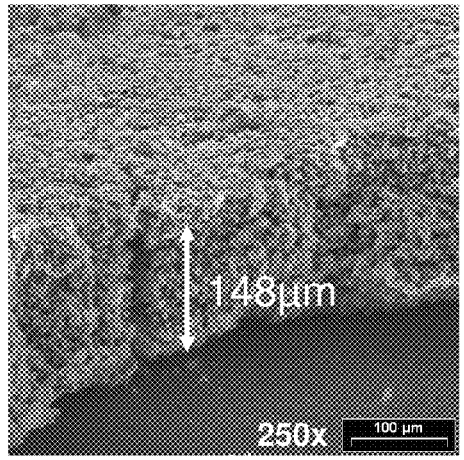
Figure 7C:
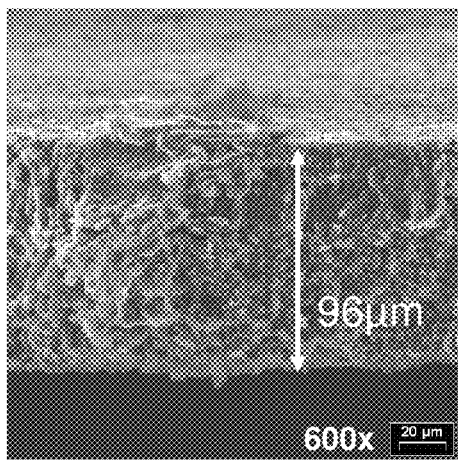
Figure 7D:
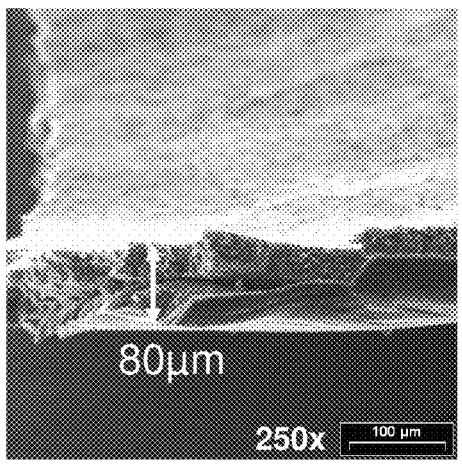

Using the same analysis as in Example 1, it was found that, after cycling in the absence of the anisotropic force but under otherwise essentially identical conditions, the anode active surface area was increased to a greater extent through charge and discharge cycles. FIG. 5 includes an SEM micrograph of a lithium anode after charge and discharge in the absence of an isotropic force. The resulting anodes were very porous, had more than doubled in thickness, and were composed primarily of decomposition products rather than metallic lithium.

EXAMPLE 3

FIGS. 6A-D includes SEM micrographs of various deposited lithium metal anodes after 30 charge/discharge cycles. The anode in FIG. 6A was cycled in the absence of an anisotropic force, while the anodes in FIGS. 6B, C, and D were cycled with applied forces defining pressures of 49, 73.5, and 98 Newtons/cm$^2$, respectively. From the micrographs, it can be seen that as the applied force was increased, the resulting lithium metal anode was thinner and less porous.

FIGS. 7A-D includes SEM micrographs of various stripped lithium metal anodes after 30 charge/discharge cycles. The anode in FIG. 7A was cycled in the absence of an anisotropic force, while the anodes in FIGS. 7B, C, and D were cycled with applied forces of 49, 73.5, and 98 Newtons/cm$^2$, respectively. Again, as the applied force was increased, the resulting lithium metal anode was thinner and less porous.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell comprising:
a cathode comprising sulfur as a cathode active material;
an anode comprising lithium metal and/or a lithium alloy as an anode active material, the anode having an active surface; and
an electrolyte in electrochemical communication with the cathode and the anode;
wherein the cell is constructed and arranged to apply, during at least one period of time during charge and/or discharge of the cell, an anisotropic force with a component normal to the active surface of the anode, the force including the component selected to define a pressure that affects surface morphology of the anode active surface to inhibit an increase in anode active surface area through charge and discharge, the pressure being of at least about 98 Newtons per square cm and less than about 196 Newtons per square cm, and wherein, in the absence of the anisotropic force but under otherwise essentially identical conditions, the anode active surface area is increased to a greater extent through charge and discharge cycles.

2. The electrochemical cell of claim 1, wherein the anode comprises a lithium alloy as an anode active material.

3. The electrochemical cell of claim 1, wherein the anisotropic force is applied uniformly over the active surface of the anode.

4. The electrochemical cell of claim 1, wherein the cathode comprises carbon.

5. The electrochemical cell of claim 1, wherein the cathode comprises a binder material.

6. The electrochemical cell of claim 1, wherein the electrochemical cell is cylindrical.

7. The electrochemical cell of claim 6, wherein the cylindrical electrochemical cell is disposed within a cylindrical containment structure.

8. The electrochemical cell of claim 1, wherein the ratio of the amount of anode active material in the anode to the amount of cathode active material in the cathode is less than 1.5:1 on a molar basis.

9. The electrochemical cell of claim 1, further comprising a porous separator between the anode and the cathode.

10. The electrochemical cell of claim 1, further comprising a separator, permeable to the electrolyte, between the anode and the cathode.

11. The electrochemical cell of claim 10, wherein the separator comprises a microporous polyethylene film.

12. The electrochemical cell of claim 1, wherein the component of the anisotropic force normal to the active surface of the anode defines a pressure of less than about 147 Newtons per square cm.

13. The electrochemical cell of claim 1, wherein the anode comprises lithium metal as an anode active material.

14. The electrochemical cell of claim 1, wherein the sulfur comprises elemental sulfur.

15. The electrochemical cell of claim 1, wherein the cell is contained within a containment structure, and at least a portion of the anisotropic force is applied by an expanding element within the containment structure and/or by a compressive element external to the containment structure.

16. The electrochemical cell of claim 1, wherein the cell is constructed and arranged to apply an anisotropic force during at least one period of time during charge of the cell and during at least one period of time during discharge of the cell.

17. The electrochemical cell of claim 1, wherein the cell is constructed and arranged to apply an anisotropic force between a charge of the cell and a discharge of the cell.

18. The electrochemical cell of claim 1, wherein the cell is constructed and arranged to apply an anisotropic force prior to a first charge of the cell and prior to a first discharge of the cell.

* * * * *